Nov. 8, 1960

J. SHARPE 2,959,708

RESONANT CAVITY ELECTRON DISCHARGE DEVICE

Filed June 2, 1958

Inventor
J. Sharpe
By Glascock Downing & Seebold
Attys.

United States Patent Office 2,959,708

Patented Nov. 8, 1960

2,959,708

RESONANT CAVITY ELECTRON DISCHARGE DEVICE

Jack Sharpe, Oxhey, England, assignor to Electric & Musical Industries Limited, Hayes, Middlesex, England, a company of Great Britain Filed June 2, 1958, Ser. No. 739,407

Claims priority, application Great Britain June 1, 1957

11 Claims. (Cl. 315—45)

Figure 1:
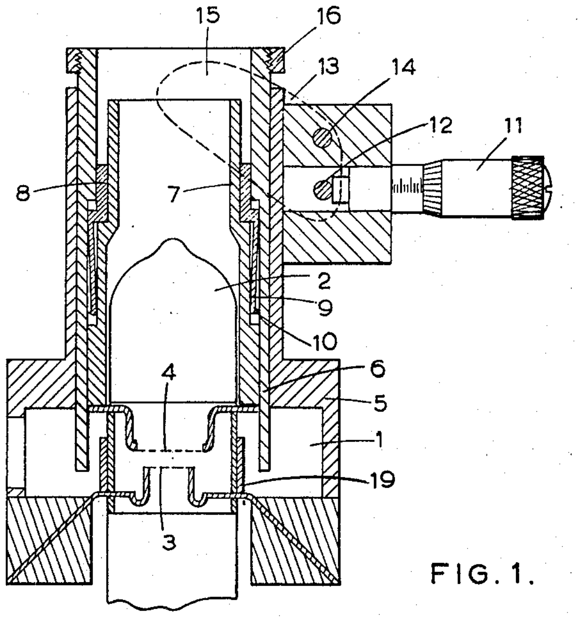

This invention relates to resonant cavities.

Frequently a resonant cavity is associated with an electron discharge device for high frequency operation, in particular with a reflex klystron tube. A reflex klystron may be associated with a fundamental radial line cavity having a $\lambda/4$ radius or a cavity operating in an harmonic mode having a $\frac{3}{4}\lambda$ radius. Frequently reflex klystrons are required to operate over a frequency range of several thousand megacycles/sec. and it will be appreciated that the variation in cavity radius required may require to be considerable. For example in a reflex klystron adapted to operate within the range 6,500 megacycles/sec. to 10,000 megacycles/sec., a $\frac{3}{4}\lambda$ cavity at 10,000 mc./s. has a diameter of 4.05 cms. whilst the diameter of the fundamental $\lambda/4$ cavity at 6,500 mc./s. is 1.8 cm. In order to enable said wide band range to be obtained without varying the the cavity radius a $\frac{3}{4}\lambda$ cavity for the highest working frequency can be employed and tuning means are provided for effecting a change in the capacitance loading of the cavity; said tuning means may for example comprise a tubular electrode having a radius equal to that of the fundamental cavity at the lowest working frequency and is therefore disposed in the vicinity of a node arranged to be axially movable within said cavity so as to vary the resonant frequency thereof within the required range.

Such an arrangement for tuning the resonant cavity has the disadvantage that the tuning rate, that is the rate of change in frequency with respect to the rate of movement of the tuning electrode, is not constant throughout the frequency range, said rate being very much less at the high frequency end of the range than at the low frequency end thereof. By way of example it is found that the tuning rate can be approximately 3 mc./s. per .001 inch of movement of the tuning electrode at the high frequency end whilst said rate is of the order of 30 mc./s. per .001 inch of movement of the tuning electrode at the low frequency end of the range. A constant tuning rate is particularly desirable when the tuning electrode is motor driven from the same motor that controls, via a variable resistance, the voltage applied to the reflector electrode of a reflex klystron with which the cavity is associated.

The object of the present invention is to provide an improved resonant cavity having means for tuning said cavity to frequencies within a range whereby the rate of tuning is rendered more constant throughout said range.

According to the invention there is provided an electron discharge device and tuning means therefor, said device including, a radial line resonant cavity for operating in an harmonic mode, defined by oppositely disposed conducting walls interconnected by an intermediate wall, said opposite conducting walls having apertures therethrough whereby electrons can pass through and between said walls to set up high frequency oscillations within said cavity and said opposite conducting walls are arranged to define a capacity gap, said tuning means being provided in the vicinity of a node in said cavity and being movable in directions transverse to the radial direction of said cavity for changing the capacitance loading of said cavity to vary the resonant frequency of said cavity, and whereby the reactive effect at said gap is changed, and means for reducing the rate of change of said reactive effect increasingly when said tuning means is moved to vary said resonant frequency from a higher frequency to a lower frequency.

The effect of the movable tuning means, which may for example be a movable tubular electrode extending into the cavity is to cause the reactive effect at the input gap to change as said tuning means is moved. The rate of change of this reactive effect is not, however, normally constant over the range of frequencies to which the cavity can be tuned but is greater at lower than at higher frequencies. This varying rate of change of reactive effect causes the aforesaid variation in the rate of change of the resonant frequency of the cavity. In order to render the rate of change of the resonant frequency of the cavity more constant the rate of change of reactive effect is made more constant and this is done by providing means within the cavity for reducing the rate of change of said reactive effect by an increasing amount as the resonant frequency is varied from a higher frequency to a lower frequency. As the resonant frequency is varied from a lower to a higher frequency the reducing means reduces the rate of change of the reactive effect by a decreasing amount.

Figure 2:
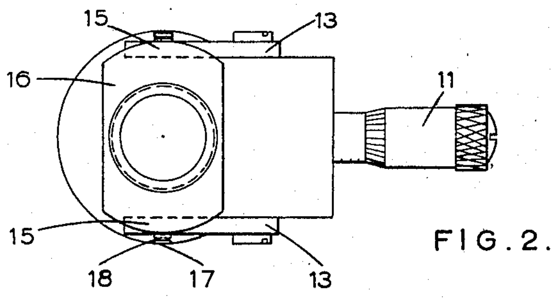
Figure 3:
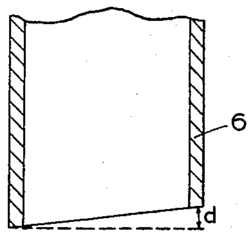
Figure 4:
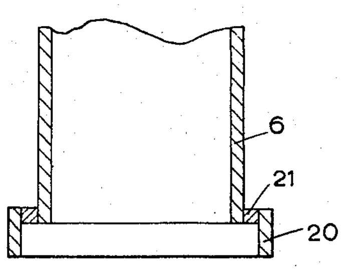

In order that the invention may be clearly understood and readily carried into effect, it will now be more fully described with reference to the accompanying drawings, in which:

Figure 1 shows a part sectional view of a reflex klystron tube associated with a resonant cavity in accordance with one embodiment of the present invention, Figure 2 shows a plan view of the arrangement shown in Figure 1, Figure 3 shows a sectional view of a tuning electrode of a resonant cavity in accordance with another embodiment of the present invention, and Figure 4 shows a sectional view of a tuning electrode of a resonant cavity in accordance with yet another embodiment of the present invention.

Referring to Figure 1 there is shown by way of example, a resonant cavity 1 associated with a reflex klystron tube 2 of the well known plug-in type. Electrodes 3 and 4 of said tube define the electron passing gap within the envelope of the tube 2 and are extended through the envelope 1, so that they can be electrically connected to resonator structure 5 as shown. The cavity 1 is preferably arranged to be a $\frac{3}{4}\lambda$ radial cavity at the highest working frequency of the tube. Tuning means in the form of a cylindrical tuning electrode 6 having a radius equal to that of a fundamental cavity at the lowest working frequency of the tube is provided and is adapted to be moved longitudinally so as to vary the resonant frequency of the cavity. The electrode 6 is thus provided in the vicinity of a node. A cylindrical member 7 forming a part of the resonator structure 5 is provided inside said tuning electrode 6 and the upper end of the member 7 is surrounded by an electrically conducting collar 8 to which is attached a plurality of leaf springs 9 having turned out ends 10. The springs 9 are adapted to reside between the electrode 6 and member 7 and said ends 10 engage the electrode 6 so as electrically to connect said electrode 6 and said member 7. Preferably a radio frequency choke of known form is provided between the member 7 and collar 8. Movement of the electrode 6 can be effected by a micrometer screw 11, shown in Figures 1 and 2, arranged to engage a spindle 12 fixed at each end to one end of a cam lever 13 the cam levers 13 being pivoted about a common support rod 14 so that movement of the micrometer screw 11 pivots said levers 13. The other end of the levers indicated at 15 are respectively adapted to engage diametrically opposite portions of a plate like collar 16 provided at the upper end of the electrode 6 and said collar 16 is provided with diametrically opposite projecting pins 17 having annular grooves each adapted to accommodate one end of a tension spring 18 secured at its other end to resonator structure 5, said springs urging the electrode 6 downwardly so that engagement of said levers 13 with said collar 16 urges the electrode 6 upwardly against the pressure of the springs 18 so as to change the resonant frequency of the cavity.

In accordance with one embodiment of the invention as shown in Figure 1, a fixed cylindrical screen 19 having a diameter less than that of the electrode 6 is arranged in the cavity preferably so as closely to surround the portion of the envelope of the valve 2 lying between the electrodes 3 and 4. The effect of the presence of the screen 19 is to reduce the reactive effect at the gap due to the electrode 6 by an increasing extent as the electrode 6 is caused to project more and more into the cavity 1. Hence the tuning rate over the range of frequencies to which the cavity 1 is tunable is made more constant than in the absence of the screen 19. By way of example such an arrangement has been found to provide a tuning rate substantially constant at 12 mc./s. per .001 inch of movement of the electrode 6 linearly over a range of 2,000 mc./s. i.e. from 7,000 to 9,000 mc./s.

In accordance with another embodiment of the invention shown in Figure 3 the lowermost edge of the cylindrical electrode 6 is arranged to lie in a plane oblique to the axis of the electrode 6 so that the separation between the lower end of the electrode 6 and the lower or facing wall of the cavity 1 varies around the cavity and hence the capacity between the lower end of the electrode 6 and said wall likewise varies around the cavity. In operation of the tuning electrode 6, when said electrode is fully inserted in the cavity 1 the reactive effect at the electron passing gap is considerably less when the end of the electrode is oblique than when said end is planar. As the electrode 6 is moved so as to project less and less into the cavity 1 however the difference in reactive effects with an oblique end and a planar end is obviously reduced. Thus the tuning rate is made more constant by using an oblique ended electrode in place of an electrode with a planar end. In one example in which the axial distance $d$ between the extremities of the obliquity, shown in Figue 3 is 1 millimetre it has been found that the tuning rate is substantially constant at 17 mc./s./.001 inch over 2,000 mc./s., that is from 7,500–9,500 mc./s.

In accordance with a further embodiment of the invention shown in Figure 4 the electrode 6 is provided at its end with a second cylindrical electrode 20 having a diameter larger than that of the electrode 6, said electrode 20 being coupled to the electrode 6 via a conducting ring 21. When the electrode 6 is fully inserted into the cavity 1 the larger diameter electrode 20 causes the reactive effect at the gap to be considerably less than in the absence of said electrode 20 whereas when the electrode 6 projects only a small distance into said cavity 1 the aforesaid reactive effect is very little different with or without the electrode 20. The difference between reactive effects with and without electrode 20 increases as the electrode 6 is inserted more and more into the cavity 1 with the result that the tuning rate is made more linear by the inclusion of electrode 20 than in the absence thereof. In one example in which the cavity 1 is a $3/4\ \lambda$ radial cavity and the tuning electrode 6 has a diameter of 18 millimetres. It has been found that by including a larger diameter electrode 20 having a diameter of 25 millimetres and a length of 2 millimetres the lowest resonant frequency of the cavity 1 can be reduced from 6,500 mc./s. when no electrode 20 is provided, to 5,800 mc./s. and the tuning rate can be made substantially constant over 1,000 mc./s. at 15 mc./s./.001".

If desired the resonant cavity 1 may be associated with an arrangement including a screen 19 as shown in Figure 1 in combination with a tuning electrode modified as shown in Figure 3 or Figure 4. Greater constancy of tuning rate will usually be obtained with such a combination.

Although the present invention has been described with particular reference to a resonant cavity associated with a reflex klystron tube it can also be applied to resonant cavities adapted to be associated with other discharge devices for high frequency operation. Although the invention has been described with particular reference to a manually tunable resonant cavity it is particularly applicable where such cavity is tuned by means such as a solenoid or an electric motor for effecting the movement of the tuning electrode.

What I claim is:

1. An electron discharge device and tuning means therefor, said device including, a radial line resonant cavity for operating in an harmonic mode defined by oppositely disposed conducting walls interconnected by an intermediate wall defining a radial line resonant cavity, said opposite conducting walls having apertures therethrough whereby electrons can pass through and between said walls to set up high frequency oscillations within said cavity and said opposite conducting walls are arranged to define a capacity gap, said tuning means being provided in the vicinity of a node in said cavity and being movable in directions transverse to the radial direction of said cavity for changing the capacitance loading of said cavity and thereby to vary the resonant frequency of said cavity and to change the reactive effect at said gap, and means for reducing the rate of change of said reactive effect increasingly when said tuning means is moved to vary said resonant frequency from a higher frequency to a lower frequency.

2. An electron discharge device and tuning means therefor according to claim 1 wherein said tuning means comprises a cylindrical electrode axially movable within said cavity.

3. An electron discharge device and tuning means therefor according to claim 1 wherein said reducing means comprises a fixed substantially cylindrical screen having a diameter less than the diameter of said tuning means, and arranged in said cavity.

4. An electron discharge device and tuning means therefor according to claim 1 wherein the shape of said tuning means is such that the distance between said tuning means and a wall of said cavity varies around said tuning means so as thereby to form said reducing means.

5. An electron discharge device and tuning means therefor according to claim 4 in which said tuning means comprises a cylindrical electrode axially movable within said cavity and the edge of an end of said electrode in said cavity lies in a plane oblique to the axis of said electrode.

6. An electron discharge device and tuning means therefor according to claim 2 wherein said reducing means comprises an electrode, electrically and mechanically coupled to said cylindrical tuning electrode, with a diameter greater than the diameter of said cylindrical tuning electrode, and extending axially beyond said cylindrical tuning electrode to form said reducing means.

7. An electron discharge device and tuning means therefor according to claim 1 in which said electron discharge device is a reflex klystron.

8. An electron discharge device and tuning means therefor, said device including a radial line resonant cavity for operating in an harmonic mode, defined by oppositely disposed conducting walls interconnected by an intermediate wall, said opposite conducting walls having apertures therethrough whereby electrons can pass through and between said walls to set up high frequency oscillations within said cavity, and said opposite conducting walls are arranged to define a capacity gap, said tuning means being provided in the vicinity of a node in said cavity and being movable in directions transverse to the radial direction of said cavity for changing the capacitance loading of said cavity and thereby to vary the resonant frequency of said cavity and to change the reactive effect at said gap, and the shape of said tuning means is such that the distance between said tuning means and said conducting wall varies around said tuning means so that the rate of change of said reactive effect is reduced increasingly when said tuning means is moved to vary said resonant frequency from a higher frequency to a lower frequency, relatively to said rate of change when said capacity is constant.

9. An electron discharge device and tuning means therefor according to claim 8 in which said tuning means comprises a cylindrical electrode axially movable within said cavity and the edge of an end of said electrode in said cavity lies in a plane oblique to the axis of said electrode.

10. An electron discharge device and tuning means therefor, said device including a radial line resonant cavity for operating in an harmonic mode, defined by oppositely disposed conducting walls interconnected by an intermediate wall, said opposite conducting walls having apertures therethrough whereby electrons can pass through and between said walls to set up high frequency oscillations within said cavity, and said opposite conducting walls are arranged to define a capacity gap, said tuning means comprising an axially movable cylindrical tuning electrode provided in the vicinity of a node in said cavity and having its axis transverse to the radial direction of said cavity for changing the capacitance loading of said cavity and thereby to vary the resonant frequency of said cavity and to change the reactive effect at said gap, and the end of said cylindrical tuning electrode in said cavity is provided with a portion having a diameter greater than the diameter of said cylindrical tuning electrode so that the rate of change of said reactive effect is reduced increasingly when said tuning electrode is moved to vary said resonant frequency from a higher frequency to a lower frequency.

11. An electron discharge device and tuning means therefor, said device including a radial line resonant cavity for operating in an harmonic mode, defined by oppositely disposed conducting walls interconnected by an intermediate wall, said opposite conducting walls having apertures therethrough whereby electrons can pass through and between said walls to set up high frequency oscillations within said cavity and said opposite conducting walls are arranged to define a capacity gap, said tuning means being provided in the vicinity of a node in said cavity and being movable in directions transverse to the radial direction of said cavity for changing the capacitance loading of said cavity and thereby to vary the resonant frequency of said cavity and to change the reactive effect at said gap, and said tuning means comprising a cylindrical electrode, and a further electrode electrically and mechanically coupled to said cylindrical electrode, with a diameter greater than the diameter of said cylindrical electrode, and extending axially beyond said cylindrical electrode whereby the rate of change of said reactive effect is reduced increasingly when said tuning means is moved to vary said resonant frequency from a higher frequency to a lower frequency, relatively to said rate of change in the absence of said further electrode.

References Cited in the file of this patent

UNITED STATES PATENTS

| | | |
|---|---|---|
| 2,410,109 | Schelleng | Oct. 29, 1946 |
| 2,506,955 | Fracassi | May 9, 1950 |
| 2,529,950 | Kather | Nov. 14, 1950 |
| 2,656,484 | Cork | Oct. 20, 1953 |
| 2,724,072 | Gardner | Nov. 15, 1955 |